United States Patent
Fisher et al.

(10) Patent No.: US 7,222,140 B2
(45) Date of Patent: May 22, 2007

(54) METHOD FOR IMPROVING THE RECOVERY TIME FROM A LOST DATABASE IN A VTS AUTOMATION SYSTEM

(75) Inventors: James Arthur Fisher, Tucson, AZ (US); Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 10/229,996

(22) Filed: Aug. 28, 2002

(65) Prior Publication Data

US 2004/0044700 A1 Mar. 4, 2004

(51) Int. Cl.
G06F 17/30 (2006.01)
(52) U.S. Cl. .................... 707/204; 707/200; 707/202
(58) Field of Classification Search ............... 707/204, 707/200, 202
See application file for complete search history.

(56) References Cited

U.S. PATENT DOCUMENTS

| | | | |
|---|---|---|---|
| 4,695,949 A * | 9/1987 | Thatte et al. ............... 707/206 |
| 5,809,511 A | 9/1998 | Peake | |
| 6,029,179 A | 2/2000 | Kishi | |
| 6,282,609 B1 | 8/2001 | Carlson | |
| 6,304,880 B1 | 10/2001 | Kishi | |
| 6,339,778 B1 | 1/2002 | Kishi | |
| 6,360,232 B1 * | 3/2002 | Brewer et al. ............... 707/204 |
| 6,732,294 B2 * | 5/2004 | Mackrory et al. ............ 714/25 |
| 2003/0200480 A1 * | 10/2003 | Beattie ........................ 714/13 |
| 2004/0205310 A1 * | 10/2004 | Yamagami .................. 711/162 |

* cited by examiner

Primary Examiner—Jeffrey Gaffin
Assistant Examiner—CamLinh Nguyen
(74) Attorney, Agent, or Firm—Kunzler & McKenzie (57) ABSTRACT

A virtual storage server and library manager are configured to avoid a lengthy check-in process for selected physical volumes. In one embodiment, the selected physical volumes are volumes that were in a checked-in state previous to a disaster. Other volumes are checked-in normally. The present invention leverages information within the virtual storage server to efficiently recovery from disasters that destroy state information within the library manager. The improved recovery method, apparatus, and system, reduce the downtime associated with disasters within removable media virtual storage systems.

17 Claims, 6 Drawing Sheets

METHOD FOR IMPROVING THE RECOVERY TIME FROM A LOST DATABASE IN A VTS AUTOMATION SYSTEM

BACKGROUND OF THE INVENTION

1. The Field of the Invention

The invention relates to methods, means, and systems for archiving data. Specifically, the invention relates to methods, apparatus, and systems for efficiently recovering from disasters within virtual storage systems comprising removable media storage units.

2. The Relevant Art

Removable media libraries are used to store large amounts of computer data. The computer data is typically recorded on a plurality of removable media such as magnetic tape cartridges or optical disk cartridges. The plurality of cartridges may be housed in a system of storage bins which are accessible by an accessor mechanism, typically a robotic arm. The accessor mechanism moves the cartridges between the storage bins and the storage units or drives for reading and writing. In many systems, the activities of the accessor are controlled by a separate computer or server known as a library manager.

Computer data stored on the removable media are typically arranged in data volume units that originally corresponded to the storage capacity of legacy cartridges. The capacity of such storage media has grown substantially in recent years. Application software and system utilities written to use removable media libraries typically assume the smaller volumes in order to ensure backward compatibility with legacy systems. Thus, the average size of data volumes in most computer or data processing centers is significantly less than the capacity of the current removable media cartridges.

A virtual storage server (VSS) is a recent development that utilizes the full capacity of a current media by storing multiple logical data volumes onto a single physical (or stacked) volume. Data which would have been stored in multiple, mostly unused physical volumes are collected and stored onto "stacked" physical volumes as separately accessible logical volumes. Older physical drives are often emulated by virtual storage servers in a transparent manner to provide backward compatibility with legacy systems. Additionally, virtual storage servers often contain local storage drives and/or large memories which are used to cache logical volumes and thereby increase performance.

In order to properly manage access to both physical and logical volumes, certain information must be collected and managed within both the library manager and the virtual storage server. Typically, that information is stored in separate databases within the library manager and the virtual storage server, some of which may be redundant. In the event of disasters, information within the library manager and the virtual storage server databases must be rebuilt. Due to the amount of information involved and the slow access rate of physical volumes, a physical volume check-in process may consume several seconds per volume—which in large libraries results in disaster recovery sequences that require several hours of additional downtime.

What is needed are means and methods to reduce the duration of disaster recovery sequences. In particular, means and methods are needed to leverage the information that may be available within a virtual storage server database and thereby streamline a physical volume check-in process.

BRIEF SUMMARY OF THE INVENTION

The apparatus of the present invention has been developed in response to the present state of the art, and in particular, in response to the problems and needs in the art that have not yet been fully solved by currently available virtual storage means and methods. Accordingly, it is an overall object of the present invention to provide an improved method, apparatus, and system for conducting disaster recovery within a virtual storage library. The improved apparatus, system and method facilitate faster disaster recovery than current means and methods.

In one aspect of the present invention, an improved library manager recovery method avoids a lengthy check-in process for selected physical volumes. In one embodiment, the selected physical volumes are volumes that were in an operational (i.e. checked-in) state previous to a disaster. The improved library manager recovery method includes an inventory volumes step, a check-in previously operational volumes step, and a check-in new volumes step. The present invention streamlines the check-in process by leveraging the information available for previously operational volumes within a virtual storage server and communicating that information to a library manager.

In a second aspect of the invention, a system for archiving data and conducting disaster recovery in an efficient manner includes a virtual storage server and a library manager. The virtual storage server is configured to map logical volumes to physical volumes and move data between a local storage cache and physical volumes comprising removable media placed within removable media storage units. The library manager is configured to mount, dismount, and track the physical volumes within the removable media storage units. The virtual storage server is further configured to conduct a streamlined check-in process for selected physical volumes during a disaster recovery sequence.

In a third aspect of the invention, a virtual storage server for use within a virtual storage system comprising removable media storage units includes a mapping module configured to map logical volumes to physical volumes, a cache configured to cache logical volume data, and a disaster recovery module configured to conduct a streamlined check-in process for selected physical volumes during a disaster recovery sequence. In one embodiment, the selected physical volumes are volumes that were in a checked-in state previous to the disaster.

In a fourth aspect of the invention, a library manager for use within a virtual storage system, the library manager includes an accessor interface configured to control the mounting and dismounting of physical volumes within removable media storage units. Also included is a tracking module configured to track the physical volumes and suspend notification of inserted volumes during a disaster recovery sequence.

The various aspects of the present invention are combined in a manner that reduces the duration required to conduct a disaster recovery sequence within a virtual storage system. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
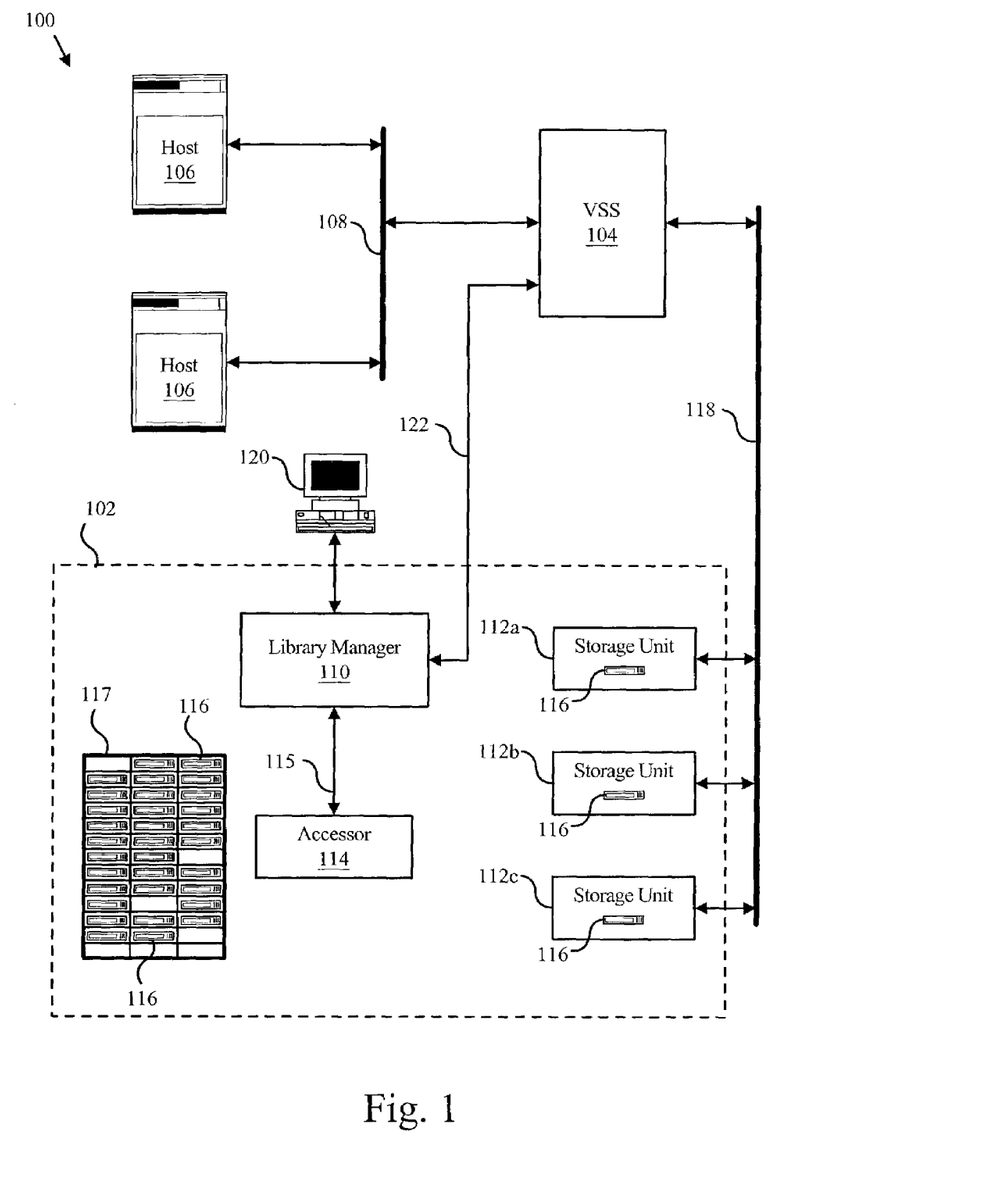
FIG. 1 is a schematic block diagram illustrating a virtual storage system representative of the environment wherein the present invention may be deployed.

FIG. 1 is a schematic block diagram illustrating one embodiment of a representative virtual storage system 100 in accordance with the present invention. The virtual storage system 100 includes a storage library 102, a virtual storage server (VSS) 104, and at least one host 106. The host 106 and the VSS 104 are connected via a storage area network (SAN) 108 or a similar communications means such as ESCON and FICON.

The storage library 102 includes a library manager (LM) 110, one or more removable media storage units 112, an accessor 114, and a plurality of physical volumes 116 such as media cartridges. The library manager 110, which includes at least one computing processor, is interconnected with, and controls the actions of, the storage units 112 and the accessor 114. Communications with the accessor 114 occur via an accessor link 115. The library manager 110 typically also includes one or more hard disk drives for memory storage.

A control console 120 is connected to the library manager 110. The control console 120 may in one embodiment simply be keyboard, monitor, and mouse attached to the library manager 110. The control console 120 enables a user to control the operating parameters of the storage library 102 independently of the host 106. The configuration and operation of the library manager 110 will be shown and described in greater detail subsequently.

In one embodiment, the accessor 114 is an automated mounting device configured to transport a selected physical volume 116 between a storage bin 117 and a storage unit 112. In another embodiment, the accessor 114 is an interface unit that directs operators to mount and dismount physical volumes 116 on the removable media storage units 112. An automated accessor 114 typically includes a cartridge gripper and a bar code scanner, or similar read system, mounted on the gripper. The bar code scanner is used to read a volume serial number (VOLSER) printed on a cartridge label affixed to the cartridge 116.

The removable media storage units 112 may be magnetic tape drives, magnetic disk drives, optical disk drives, or the like. Similarly, the physical volumes 116 may contain magnetic media, optical media, or any other removable media corresponding to the type of storage unit 112 employed. Preferably, the physical volumes 116 contain a plurality of logical volumes that are 'stacked' onto a physical volume and configured for backward compatibility with legacy systems. Generally, the use of the term 'volumes' within this description refers to physical (i.e. stacked) volumes unless noted otherwise.

In FIG. 1, three storage units 112a, 112b, and 112c are shown. The present invention is operable with one or any larger number of tape drive units 112. The tape drive units 112 may share one single repository of physical volumes 116. Alternatively, the removable media storage units 112 may utilize multiple repositories of the physical volumes 16.

Data for storage or retrieval may be transmitted directly between the virtual storage server 104 and the storage units 112 via a storage channel 118. In one embodiment, the storage channel 118 conforms to the Fibre Channel standard. A library link 122 interconnects the library manager 110 and the virtual storage server 104. The library link 122 may be dedicated communication means such as a serial link or non-dedicated dedicated communication means such as a LAN. In the depicted embodiment, any communication between the library manager 110 and the storage units 112 occurs indirectly via the library link 122, the virtual storage server 104, and the storage channel 118.

Figure 2:
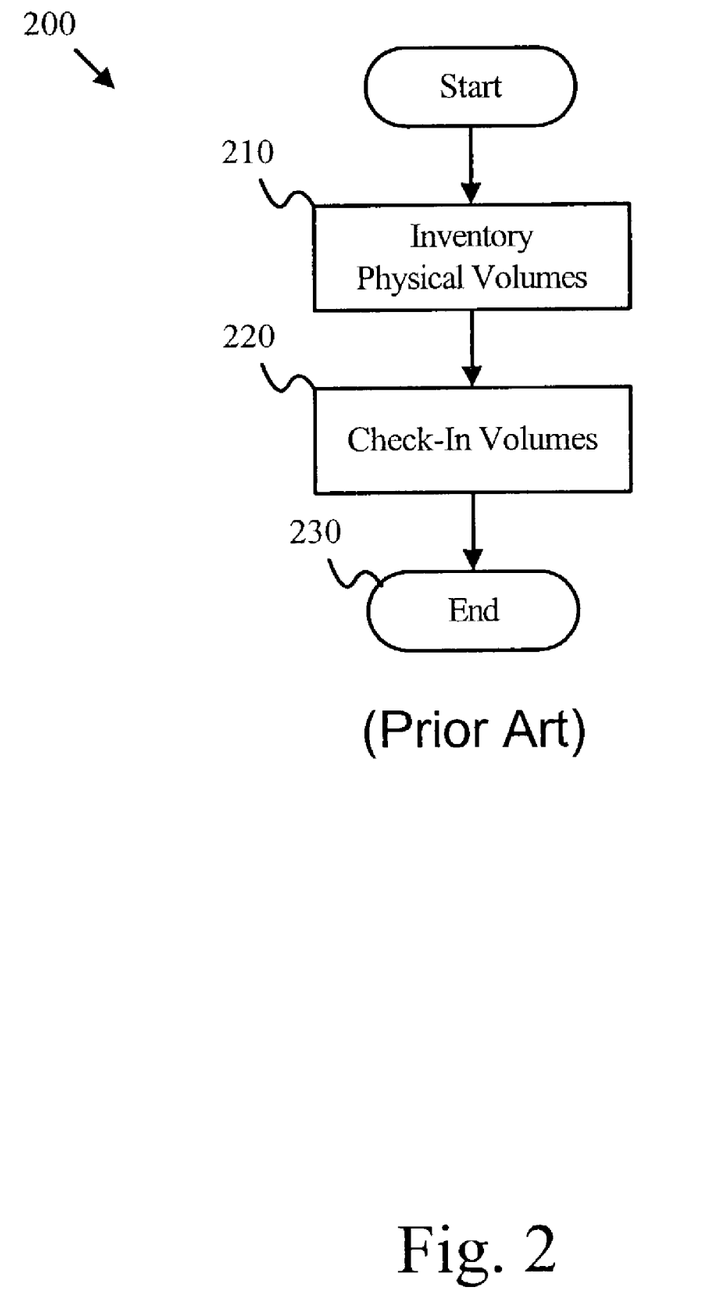
FIG. 2 is a flow chart illustrating a typical prior art library manager recovery method.

FIG. 2 is a flow chart illustrating a typical prior art library manager recovery method 200. The recovery method 200 is conducted in response to a disaster or at other appropriate times in conjunction with a library manager such as the library manager 10 depicted in FIG. 1. The recovery method 200 initializes the state of the library manager and facilitates initialization to an operational state in the event of disasters.

The recovery method 200 includes an inventory volumes step 210 and a check-in step 220. The inventory volumes step 210 identifies the volumes that are inserted into the storage bins 117. In one embodiment, the inventory step 210 comprises determining a volume serial number for each media cartridge 116 stored within the storage bins 117. The identified volumes are typically communicated to a host or server such as the virtual storage server 104, either in conjunction with the inventory volumes step 210 or in response to a query by the virtual storage server 104.

After the volumes are inventoried, the check-in step 220 conducts a check-in process for each volume present. After the check-in step 220, the method 200 ends 230. While the recovery method 200 is relatively straightforward, the method does not coordinate with the virtual storage server or host to eliminate unneeded processing. The check-in step 220 may be quite time consuming. For example, in certain embodiments a database record must be created for each physical volume 116. Such knowledge may already reside within the virtual storage server 104 or host 106. Often, the check-in process for a large set of volumes consumes several hours. What is needed is a streamlined check-in process that uses any available information to eliminate unnecessary access to the physical volumes 116.

Figure 3:
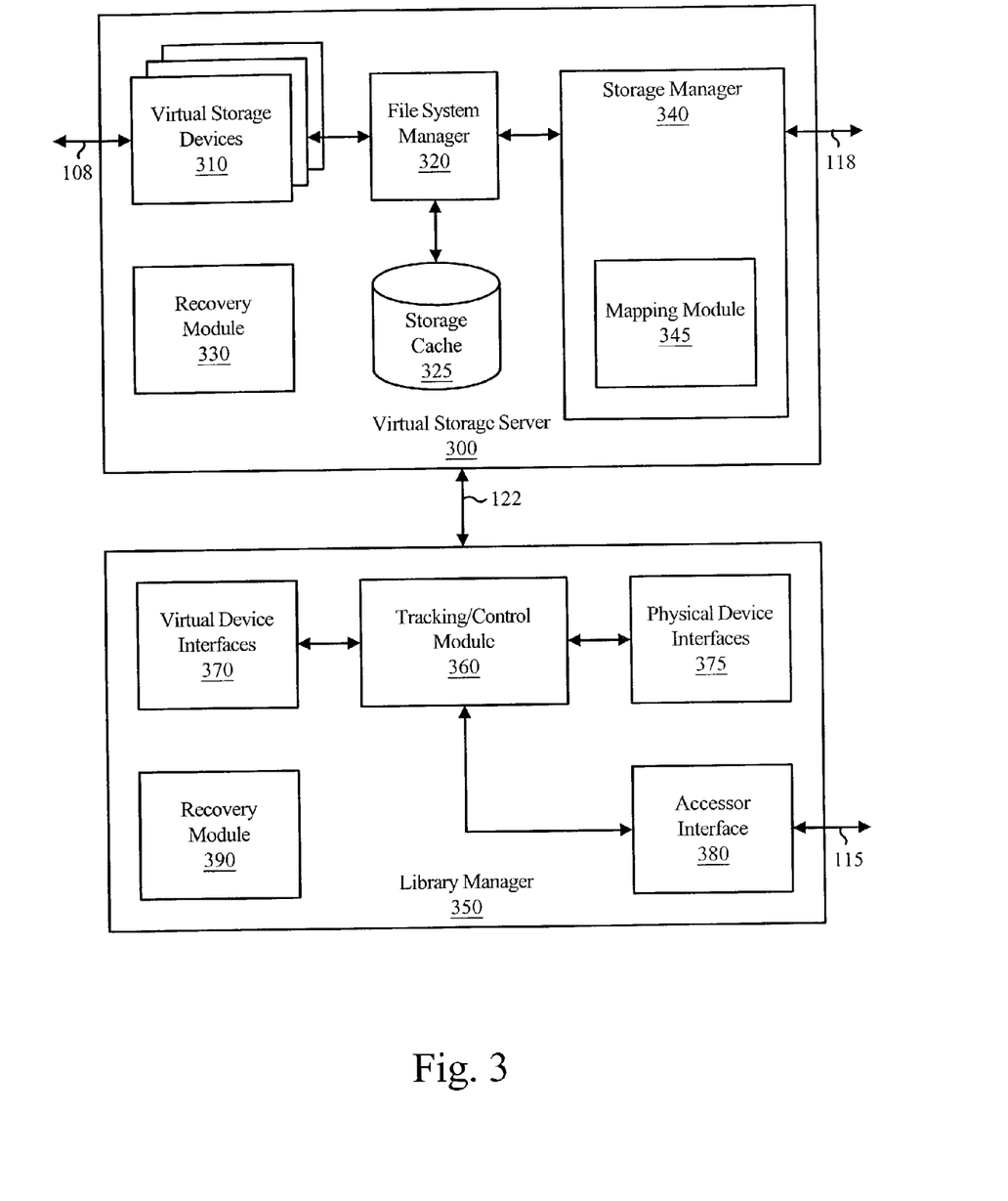
FIG. 3 is a block diagram illustrating one embodiment of the functional modules of a library manager and virtual storage server of the present invention.

FIG. 3 is a block diagram illustrating several modules of an improved virtual storage server (VSS) 300 and an improved library manager 350 of the present invention. The improved virtual storage server (VSS) 300 and the improved library manager 350 are configured to reduce unneeded processing during a recovery process such as is typically conducted after a disaster.

The VSS 300 includes one or more virtual storage devices 310, a file system manager 320, a storage cache 325, a recovery module 330, and a storage manager 340 with a mapping module 345. The virtual storage devices 310 provide an interface to one or more hosts that is software compatible with legacy storage devices or subsystems. In one embodiment, the virtual storage devices appear as two to sixteen 3490E control units, each with 16 tape drives. In the depicted embodiment, the VSS 300 communicates with one or more hosts via the storage network 108.

Internally, in one embodiment, a logical volume is stored as a file within a file system. The logical volume files may reside on the storage cache 325 under control of the file system manager 320. Logical volumes may also reside on actual physical volumes under control of the storage manager 340. The mapping module 345, which in the depicted embodiment is part of the storage manager 340, maintains the relationship between logical volumes and stacked physical volumes such as the media cartridges 116 shown in FIG. 1. In the depicted embodiment, the storage manager 340 communicates with the storage units 112 via the storage channel 118. Recovery processing within the VSS 300 is conducted under direction of the recovery module 330.

The library manager 350 includes a tracking/control module 360, one or more virtual device interfaces 370, one or more physical device interfaces 375, an accessor interface 380, and a recovery module 390. The recovery module 390 works in conjunction with the recovery module 330 work together to restore the library manager 350 to an operational state in the event of a disaster.

The tracking/control module 360 within the library manager 350 controls insertion and removal of the physical volumes within removable media storage units such as the storage units 112 shown in FIG. 1. To maintain a proper mapping of logical volumes and their current physical placement, movement of the physical volumes to and from the storage units 112 is coordinated by the tracking/control module 360 and the storage manager 340.

The virtual device interfaces 370 and the physical device interfaces 375 provide interface and communication functions for the tracking/control module 360 to communicate with and control the virtual storage devices 310 and the storage units 112. For example, mounting and dismounting operations may be initiated by the tracking/control module 360 via the virtual device interfaces 370 and the physical device interfaces 375 for logical volumes and physical volumes respectively.

In the depicted embodiment, communication between the modules of the VSS 300 and the library manager 350 occur via the library link 122. Likewise, communications between an accessor such as the accessor 114 depicted in FIG. 1, and the library manager 350, occur via the accessor link 115. Within the library manager 350, communication and control of the accessor occurs via the accessor interface 380.

Figure 5A:
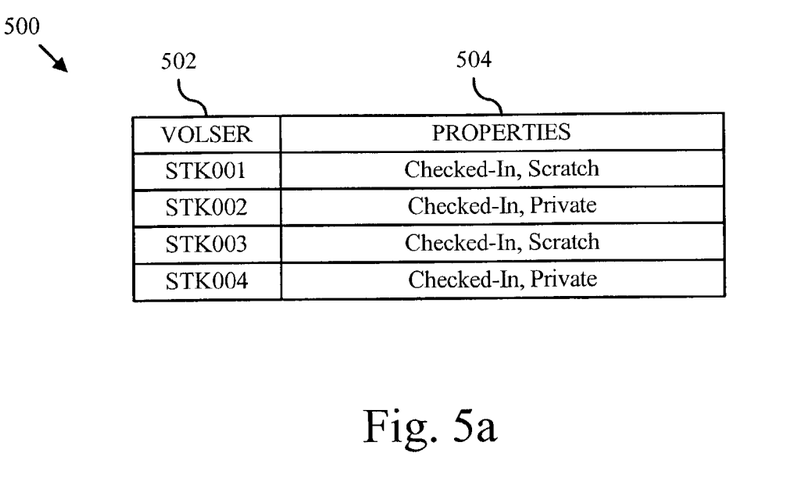
FIG. 5a is a table depicting various information elements used in conjunction with one embodiment of the virtual storage server of the present invention.
Figure 5B:
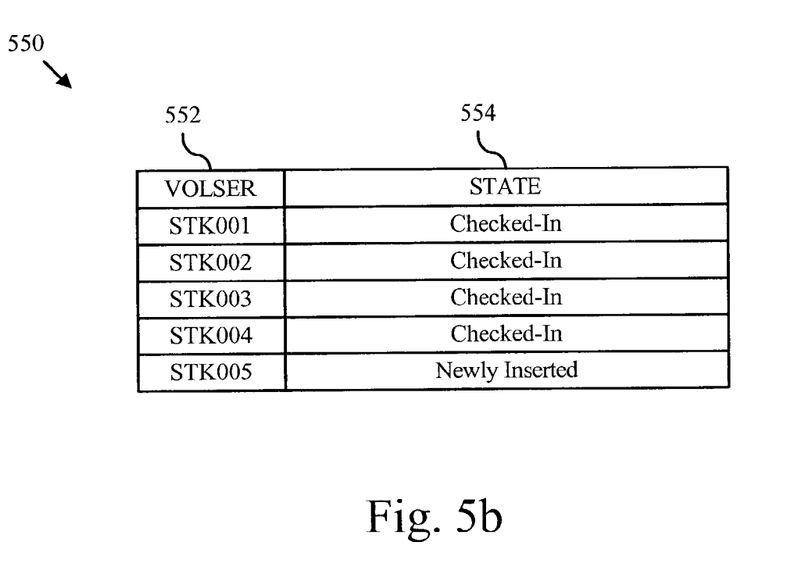
FIG. 5b is a table depicting various information elements used in conjunction with one embodiment of the library manager of the present invention.
Figure 6:
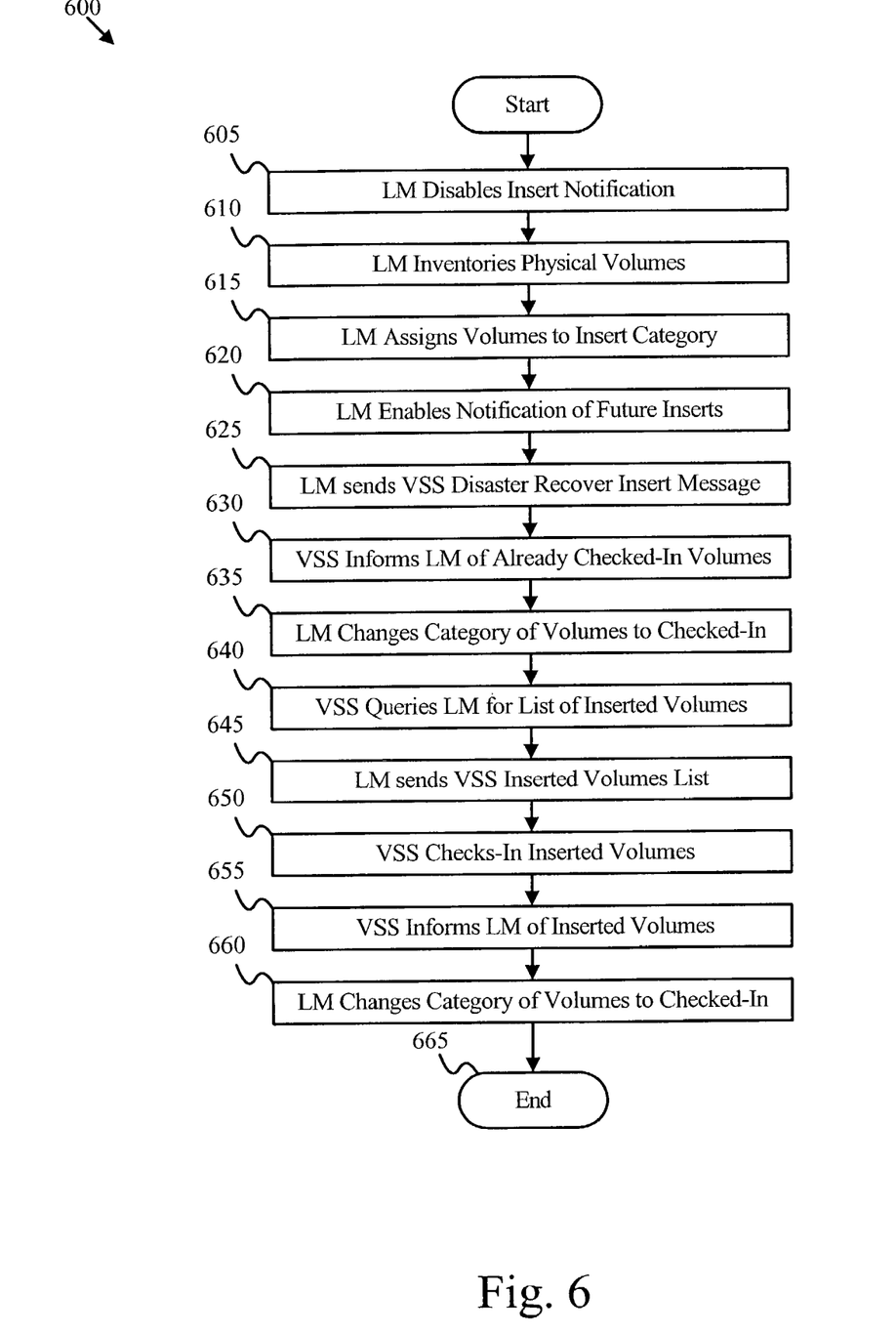
FIG. 6 is a flow chart illustrating one embodiment of a streamlined check-in process of the present invention.

The elements of FIG. 3 work together to provide high performance disaster recovery. The actual processing steps are illustrated in FIGS. 4–6 and described in more detail within the subsequent description.

Figure 4:
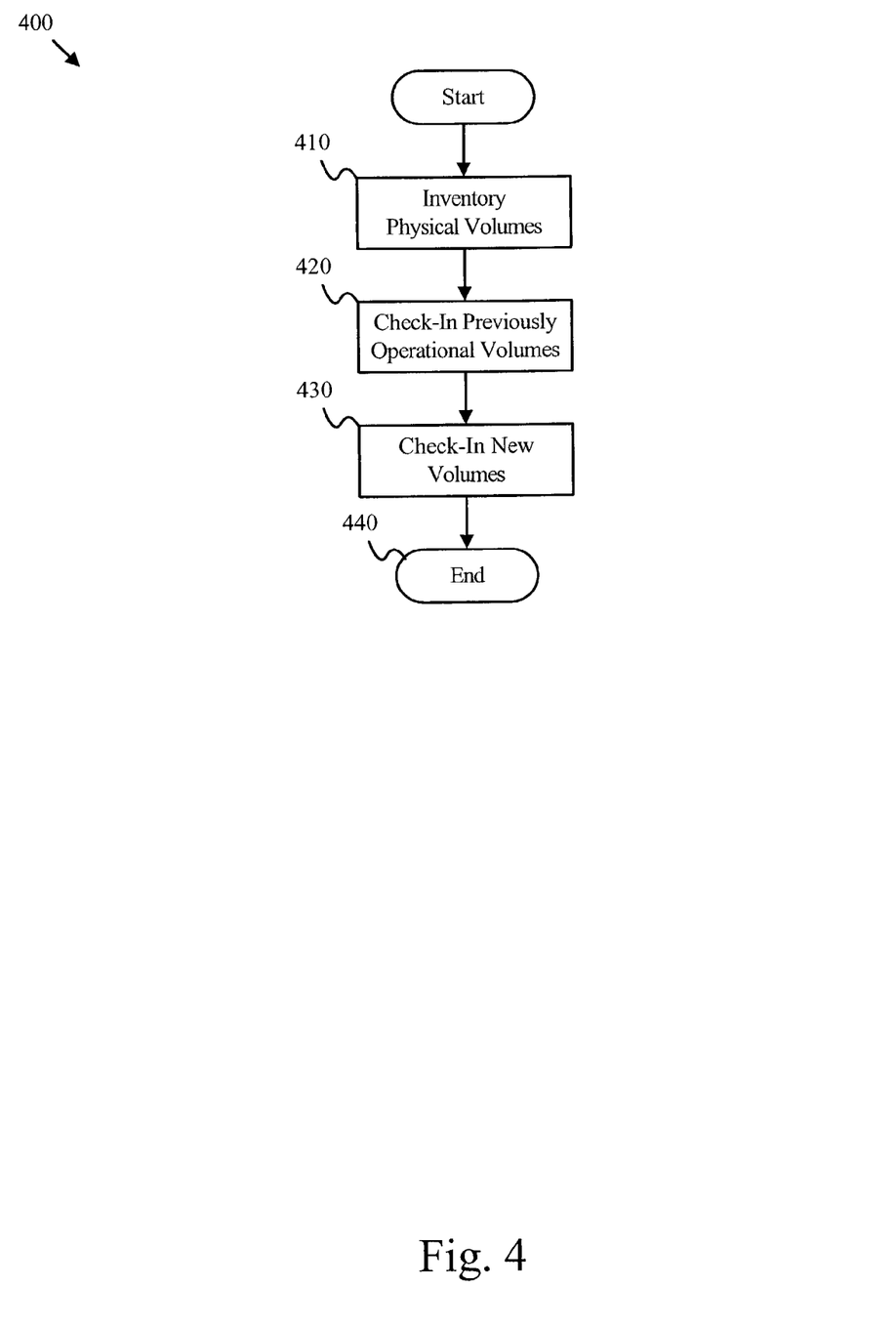
FIG. 4 is a flow chart depicting one embodiment of an improved library manager recovery method in accordance with the present invention.

FIG. 4 is a flow chart depicting one embodiment of an improved library manager recovery method 400 in accordance with the present invention. The improved library manager recovery method 400 avoids a lengthy check-in process for selected physical volumes. The method 400 includes an inventory physical volumes step 410, a check-in previously operational volumes step 420, and a check-in new volumes step 430. The improved library manager recovery method 400 may be conducted in conjunction with the library manager 350 and the virtual storage server 300.

During the inventory physical volumes step 410, the improved recovery method 400 identifies those volumes that are inserted into the storage bins 117. In one embodiment, the inventory physical volumes step 410 is essentially the same as the inventory volumes step 210 and comprises determining a volume serial number for each media cartridge 116 stored within the storage bins 117. Preferably, the inventory physical volumes step 410 is initiated by the recovery module 390 within the library manager 350 in conjunction with the tracking/control module 360. In certain embodiments, the specific identified volumes are immediately communicated to the virtual storage server 300 while in other embodiments the identified volumes are not communicated to the virtual storage server 300 unless they are not checked-in during the check-in step 420.

The check-in step 420 conducts a streamlined check-in process for those volumes that were in an operational state previous to the disaster. In one embodiment, the streamlined check-in step 420 comprises retrieving volumes that were in a checked-in state previous to the disaster from a database within the virtual storage server 300. In the described embodiment, the check-in step 420 also includes communications to the tracking/control module 390 within library manager 350 to initiate placement of the previously operational volumes to a checked-in state within the library manager. In one embodiment, insert notification is disabled previous to identifying the volumes and enabled after the inventory is completed.

Subsequent to the check-in previously operational volumes step 420 the improved recovery method 400 conducts the check-in new volumes step 430. In one embodiment, the check-in new volumes step 430 comprises a query of the library manager by the virtual storage server for a list of volumes that have been inserted but not checked-in. In the described embodiment, the query is followed by a normal check-in process for the listed volumes.

As described above, the improved recovery method 400 leverages the information within the virtual storage server to conduct a streamlined check-in process for volumes that were in an operational state previous to a disaster and conducts a normal check-in process for all other volumes. One embodiment of the improved recovery method 400 will be described in more detail in conjunction with FIG. 6.

FIG. 5a is a table depicting various information elements 500 used in conjunction with one embodiment of the virtual storage server of the present invention. As shown, the information elements 500 include a volume serial number (VOLSER) 502 and properties 504. The properties 504 indicate the attributes of the particular physical volume identified by the VOLSER 502. Examples of possible properties 504 include whether a volume contains private data or scratch data and the state of the volume such as (newly) inserted, checked-in, or the like. In one embodiment, the information elements 500 are stored within a database on a virtual storage server such as the virtual storage server 300.

FIG. 5b is a table depicting various information elements 550 used in conjunction with one embodiment of the library manager of the present invention. As shown, the information elements 550 include a volume serial number (VOLSER) 552 and a state or category 554. The category 554 defines the present state of the particular physical volume identified by the VOLSER 552. Examples of categories or states include void or unknown, inserted (i.e. newly inserted), checked-in, and manually ejected. In one embodiment, the information elements 550 are stored within a database on a library manager such as the library manager 350.

Typically, the information elements 500 and 550 are stored within respective databases within the virtual storage server 300 and the library manager 350 respectively. As such, the virtual storage server 300 and the library manager 350 may each maintain information relative to the state of the physical volumes 116. The present invention uses the redundant information to streamline a check-in process for selected volumes and thereby improve the performance of disaster recovery operations within a virtual storage system such as the virtual storage system 100.

FIG. 6 is a flow chart illustrating one embodiment of a disaster recovery method 600 of the present invention. The disaster recovery method 600 is a more specific example of one manner of conducting the disaster recovery method 400, and may be used in conjunction with the virtual storage server 300 and the library manager 350 depicted in FIG. 3. The disaster recovery method 600 is preferably conducted in response to ascertaining that a disaster has occurred. In one embodiment, ascertaining is conducted by an operator or other personnel, and the recovery method 600 is executed in response to an operator selecting to perform an inventory process to rebuild the systems.

The disaster recovery method 600 begins with a disable step 605, wherein the library manager disables notification of inserts. Disabling insert notification facilitates a streamlined check-in process for selected volumes such as volumes that were in a checked-in state previous to the disaster. At an inventory step 610, the disaster recovery method 600 conducts an inventory of the physical volumes 116 that are present within the storage bins 117. In response to the inventory step 610, the library manager assigns the inventoried volumes to the insert category at an insert step 615.

Subsequent to the insert step 615, the library manager enables notification of future inserts at an enable step 620. Enabling notification facilitates a normal check-in process for subsequently inserted volumes. At a send message step 625, the library manager sends a message to the virtual storage server indicating one or more new volumes have been inserted in conjunction with a disaster recovery.

In response to the message indicating one or more new volumes have been inserted in conjunction with a disaster recovery, the virtual storage server informs the library manager of any volumes that are already checked-in at an inform step 630. The virtual storage server thus skips the normally lengthy check-in process for those volumes. In turn, the library manager (tracking module) places those volumes within the checked-in category at a change category step 635.

Beginning at a query step 640, the disaster recovery method 600 resumes the normal check-in process for inserted volumes. Specifically, at the query step 640, the virtual storage server queries the library manager for any inserted volumes. In response, the library manager sends the virtual storage server the list of inserted volumes at a respond step 645. At a check-in step 650, the virtual storage server conducts the normal check-in process for the inserted volumes. In one embodiment, the normal check-in process comprises creating a record within a database containing information for each physical volume 116.

Upon completion of the check-in step 650, the disaster recovery method 600 continues to an inform step 655, in which the virtual storage server informs the library manager of the newly inserted volumes. In response, the library manager places those volumes within the checked-in category at a change category step 660. Subsequently, the disaster recovery method 600 ends at an exit step 665.

The present invention reduces the duration of conducting a disaster recovery sequence. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for efficient disaster recovery in a virtual storage system comprising removable media storage units, the method comprising:
   ascertaining that a disaster has occurred;
   conducting a separate, streamlined check-in process for selected physical volumes during a disaster recovery sequence; and
   conducting a standard check-in process for other volumes, wherein the selected physical volumes are physical volumes that were in an operational state in the virtual storage system prior to the disaster and wherein the other volumes are volumes that were not in an operational state in the virtual storage system prior to the disaster.

2. The method of claim 1, wherein the operational state is a checked-in state.

3. The method of claim 1, wherein conducting a separate, streamlined check-in process further comprises suspending notification of inserted volumes during the disaster recovery sequence.

4. The method of claim 1, wherein conducting a separate, streamlined check-in process further comprises cataloging those physical volumes that are present during the disaster recovery sequence.

5. The method of claim 1, wherein conducting a separate, streamlined check-in process further comprises notifying a library manager that a physical volume has been checked in.

6. The method of claim 1, wherein conducting a separate, streamlined check-in process further comprises resuming notification of inserted volumes during the disaster recovery sequence.

7. A system for archiving data and conducting disaster recovery in an efficient manner, the system comprising:
 a virtual storage server configured to map logical volumes to physical volumes and cache logical volume data;
 a library manager configured to mount the physical volumes within removable media storage units; and
 a virtual storage server configured to conduct a separate, streamlined check-in process for selected physical volumes during a disaster recovery and a standard check-in process for other volumes,
 wherein the selected physical volumes are physical volumes that were in an operational state in the virtual storage system prior to the disaster and the other volumes are volumes that were not in an operational state in the virtual storage system prior to the disaster.

8. The system of claim 7, wherein the operational state is a checked-in state.

9. The system of claim 7, wherein the library manager is further configured to suspend notification of inserted volumes during the disaster recovery sequence.

10. The system of claim 7, wherein the library manager is further configured to inform the virtual storage serve of those physical volumes that are present during the disaster recovery sequence.

11. The system of claim 7, wherein the virtual storage server is further configured to notify the library manager that a selected physical volume has been checked in.

12. The system of claim 7, wherein the library manager is further configured to resume notification of inserted volumes during the disaster recovery sequence.

13. A virtual storage server for use within a virtual storage system comprising removable media storage units, the virtual storage server comprising:
 a mapping module configured to map logical volumes to physical volumes;
 a cache configured to cache logical volume data; and
 a disaster recovery module configured to conduct a separate, streamlined check-in process for selected physical volumes during a disaster recovery sequence and a standard check-in process for other volumes,
 wherein the disaster recovery module is further configured to conduct the streamlined check-in process for physical volumes which were in an operational state in the virtual storage system prior to the disaster and the other volumes are volumes that were not in an operational state in the virtual storage system prior to the disaster.

14. The virtual storage server of claim 13, wherein the disaster recovery module is further configured to notify a library manager that a selected physical volume has been checked in.

15. A system for archiving data and conducting disaster recovery in an efficient manner, the system comprising:
 a virtual storage server configured to map logical volumes to physical volumes and cache logical volume data;
 a library manager configured to mount the physical volumes within removable media storage units, suspend notification of inserted volumes during a disaster recovery sequence, and inform the virtual storage server of those physical volumes that are present during the disaster recovery sequence; and
 the virtual storage server further configured to conduct a separate, streamlined check-in process for selected physical volumes and a standard check-in process for other volumes, the selected physical volumes comprising physical volumes that were in a checked-in state prior to the disaster, the virtual storage server further configured to notify the library manager that a selected physical volume has been checked in.

16. A system for archiving data and conducting disaster recovery in an efficient manner, the system comprising:
 means for mapping logical volumes to physical volumes;
 means for caching logical volume data;
 means for mounting the physical volumes within removable media storage units;
 means for suspending notification of inserted volumes during a disaster recovery sequence and a standard check-in process for other volumes; and
 means for conducting a separate, streamlined check-in process for physical volumes that were in a checked-in state prior to a disaster.

17. A computer readable medium comprising computer code configured to carry out a method for archiving data and conducting disaster recovery in an efficient manner, the method comprising:
 mapping logical volumes to physical volumes;
 caching logical volume data;
 mounting the physical volumes within removable media storage units;
 suspending notification of inserted volumes during a disaster recovery sequence; and
 conducting a separate, streamlined check-in process for physical volumes that were in a checked-in state prior to a disaster and a standard check-in process for other volumes.

* * * * *